Jan. 19, 1937.  W. B. BOHANNON  2,068,367
METHOD OF AND APPARATUS FOR MANUFACTURING ARTICLES
Filed April 5, 1934   2 Sheets-Sheet 1
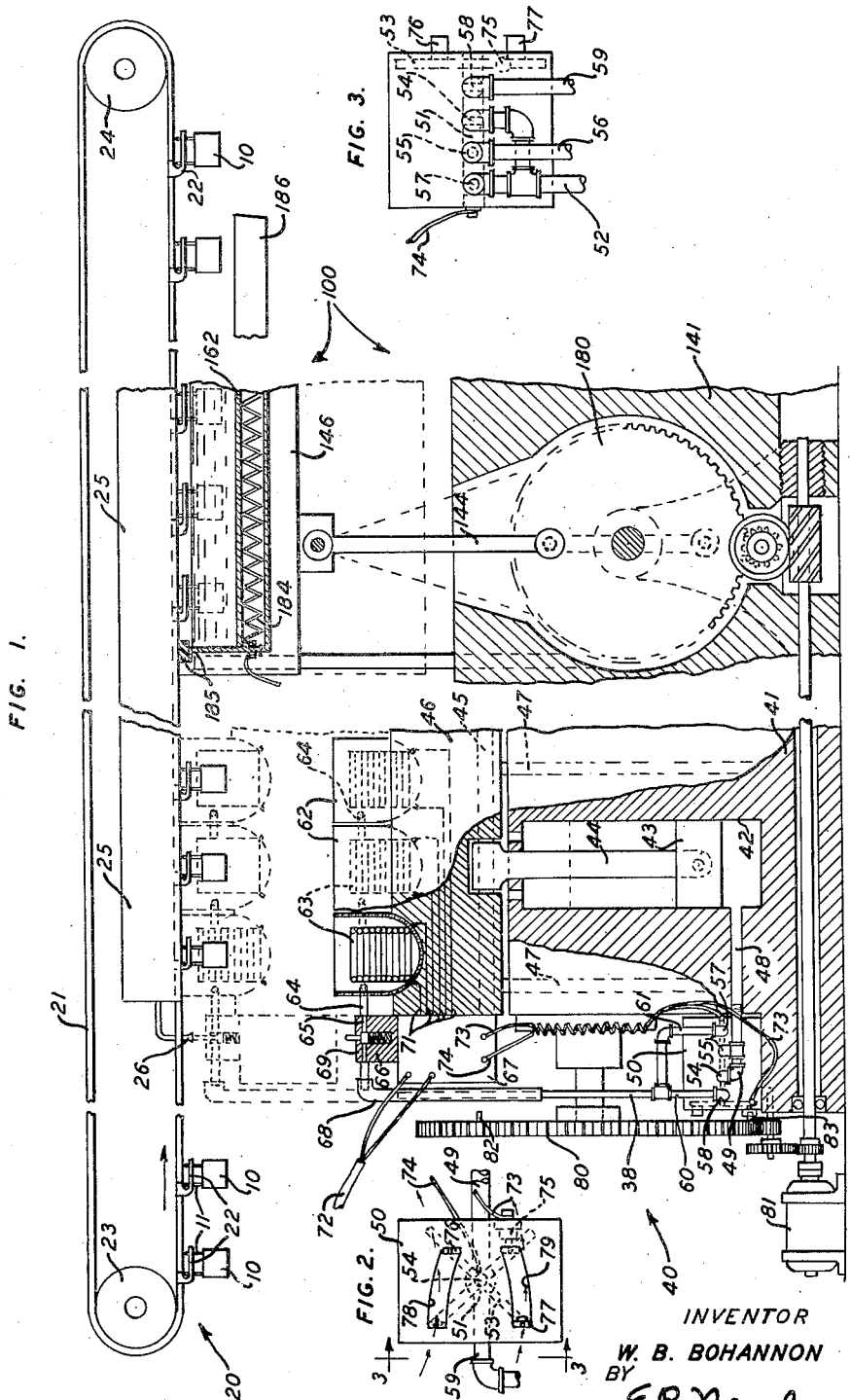
INVENTOR
W. B. BOHANNON
BY
E. R. Nowlan
ATTORNEY Jan. 19, 1937.  W. B. BOHANNON  2,068,367
METHOD OF AND APPARATUS FOR MANUFACTURING ARTICLES
Filed April 5, 1934   2 Sheets-Sheet 2

INVENTOR
W. B. BOHANNON
BY E. R. Nowlen
ATTORNEY

Patented Jan. 19, 1937

2,068,367

UNITED STATES PATENT OFFICE 2,068,367

METHOD OF AND APPARATUS FOR MANUFACTURING ARTICLES

William B. Bohannon, Westfield, N. J., assignor to Western Electric Company, Incorporated, New York, N. Y., a corporation of New York Application April 5, 1934, Serial No. 719,136

7 Claims. (Cl. 91—55)

This invention relates to a method of and apparatus for manufacturing articles and more particularly to a method of manufacturing electrical condensers and to apparatus for practising the method characterized by adaptability to straight-line automatic operation and including an improved method and apparatus for heating and drying articles such as electrical condensers having metallic internal members.

An object of the invention is to provide a method and an apparatus for drying articles such as electrical condensers and others having metallic internal members by means of heat generated by electrical induction within the metallic members.

With the above and other objects in view one embodiment of the invention may be a method and an apparatus for manufacturing electrical condensers of the stack type in which the assembled condensers are advanced on a conveyor and are subjected successively to automatically acting means to heat, evacuate, and impregnate them with a moisture proof sealing material, an ancillary part of the invention being the method of and means for heating the condensers to drive out moisture therefrom which include the step of and means for subjecting the condensers to the magnetic field within a conductive helix carrying a current of electricity of high frequency and which may include the step of and means for subjecting the condensers to evacuation and to a non-oxidizing gas such as carbon, dioxid or nitrogen before, during or after the heating. The heating is occasioned by electro-magnetic effects such as eddy currents or hysteresis losses generated by the rapidly alternating magnetic field within the metal foils and other metallic parts of the condensers. Satisfactory heating throughout and thorough drying is thus attained in a period of minutes or even seconds as compared with the hours or even days required if an oven be used.

Other objects and features of the invention will appear from the following detailed description of one embodiment of the invention in a method and an apparatus for manufacturing electrical condensers taken in connection with the accompanying drawings in which the same reference numerals are applied to identical elements in the several figures and in which Fig. 1 is a partly diagrammatic broken view of an apparatus constructed in accordance with the invention for automatically heating, drying, evacuating, and gas charging condensers, and then impregnating them with sealing compound all according to the method of the invention;

Fig. 2 is a detached enlarged view in left hand end elevation of the combined fluid and electrical current control assembly thereof;

Fig. 3 is a view on the line 3—3 of Fig. 2;

Figure 4:
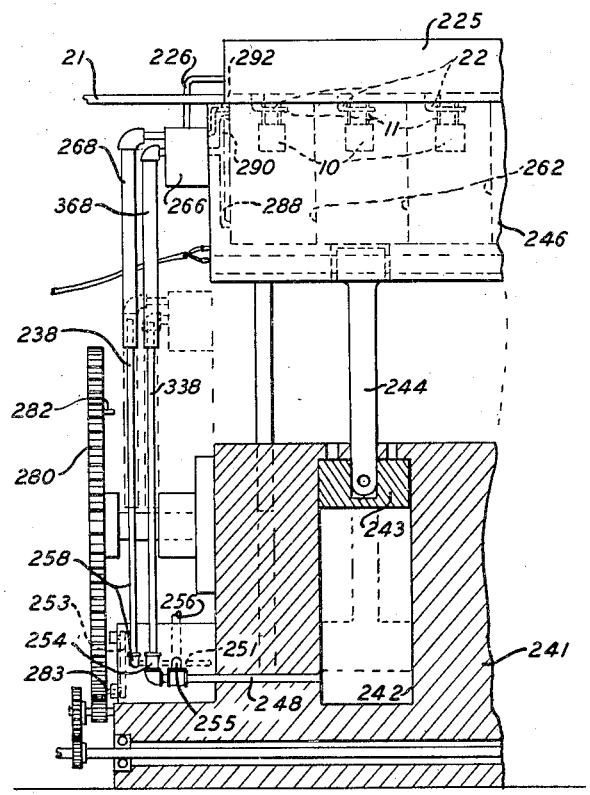
Fig. 4 is a view similar to Fig. 1 of a modified form of impregnating means.

In the apparatus disclosed in Figs. 1 and 2, a belt conveyor generally indicated by the numeral 20 is associated with a heating unit generally indicated at 40 and a dipping or impregnating unit generally indicated at 100.

The conveyor 20 may be of any approved construction and is not disclosed here in detail as the mode of its construction and operation is not generally relevant to the invention. It may, however, be thought of as a belt 21 of leather, canvas and rubber, or the like carrying hooks 22 or other suitable devices preferably of non-metallic material for detachably supporting electrical condensers 10 shown as of the stack or pack type, by the protruding terminals 11 of the condensers. The belt 21 may be thought of as running over pulleys 23 and 24, one or both of which may be driven by motor means not shown.

The lower half of the horizontally disposed belt runs in the direction of the arrow over an appropriate part of its path with its upper face in contact with and supported at certain times by a backing member 25 here shown as a simple parallelopipedal block preferably of non-metallic material supported by any suitable means not shown. A vertically oriented rod 26 having a function to be described later, is mounted as shown in the left end of the block 25 and passes down past the rear edge of the belt.

The heating unit 40 comprises a base block 41 having a cylindrical chamber 42 hereinafter termed the cylinder 42, therein. A piston 43 in the cylinder carries a vertically oriented piston rod 44, the upper end of which is pivoted on a shaft 45 mounted in an oven block 46 arranged to be moved up and down by the piston and piston rod and guided by guide rods 47 integral with the oven block and sliding in corresponding bores in the base block. An air bore 48 leads from the cylinder 42 to a compressed air supply pipe 49 which enters a control box 50 and is connected via a valve 51 to a pipe 52 leading to a source of compressed air not shown. The valve 51 is mounted on a shaft 54 rotated by a lever arm 53 thereon. A second valve 55 on the same shaft 54 behind (Fig. 2) the valve 51 communicates at one side with the bore 48 and at the other side with an open exhaust vent or pipe 56. A third valve 57 also on the shaft 51 communicates at one side with the compressed air pipe 52 and at the other side with a vertical riser 38 by way of a pipe 61, and a fourth valve 58 also on the shaft 51 connects a vacuum line 59 to the riser 38 by way of a pipe 60.

On the top of the oven block 46 is located a series of inverted bell jars 62, and in each jar is mounted an insulated conductive helix 63 with its axis vertical and concentric to the bell jar. Each jar is entered by a pipe 64 leading to a horizontal bore 65 in a valve block 66 rigidly mounted on a housing 67 attached to the left hand face (Fig. 1) of the oven block. Bore 65 passes through a cylindrical valve recess vertically disposed in the block 66 and communicates by way of a telescopic connection 68 with the riser 38. A spring pressed valve piston 69 in the valve recess closes the bore 65 normally, but is displaceable downwardly by the rod 26, to open the bore 65.

Leads 71 from the helices 63 run to and enter the housing 67. Power supply leads 72 from any suitable electrical power source not shown also enter the housing 67. Power control leads 73 and 74 run from the housing to the control box 50, lead 73 being connected to an insulated terminal 75 on the box and lead 74 being connected to the shaft 51. Terminal 75 is so positioned as to be in contact with lever arm 53 in one extreme position thereof to close a circuit through leads 73 and 74.

The devices housed in the housing 67 are all well known and their nature and construction form no part of and are irrelevant to the present invention. Suffice it to say that current from one of the leads 72 enters lead 73 or 74 and returns to the housing via lever arm 53 and contact 75 and lead 74 or 73. Here it is used to produce an alternating current of high frequency whch is fed through the leads 71 to the helices 63. In one instance the current thus fed to one helix was of a frequency of the order of 500 kilocycles and had an effective amperage of 30. This current will flow only when lever arm 53 is in contact with terminal 75.

Lever arm 53 is housed within the box 50 and carries at each end one of a pair of slides 76 and 77 mounted pivotally on the lever arm and free to slide respectively in arcuate slots 78 and 79 in the wall of the box 50.

A large gear wheel 80 is mounted on a stub shaft journalled in the base block 41 and is driven through appropriate gears by a motor 81. Two pins 82 and 83 are mounted in the side of the wheel 80 in position to strike against the slides 76 and 77 respectively if either of these be at the left hand end (Fig. 2) of its arcuate guide slot, and to carry the slide from left to right in the slot, the slot being so curved as to carry the slide out of contact with the pin at the right hand end of the slot. Thus pin 82 acts to turn the shaft 51 clockwise (Fig. 2) and pin 83 acts reversely.

The dipping or impregnating unit 100 comprises a base block 141 which may or may not be continuous with the base block 41 of the heating unit. A large gear wheel 180 is rotatably mounted in an appropriate recess of the block 141 on a shaft journalled therein and is driven through appropriate gearing and shafting by the motor 81 or by an independent motor as desired. A connecting rod 144 is pivoted at its lower end to the wheel 180 and at its upper end to a vertically reciprocable tank block 146 having guide rods sliding in corresponding bores in the base block 141. An impregnating tank 162 adapted to hold a bath of normally liquid or of molten impregnating and sealing compound is carried on the block 146 and is provided with means such as an electric heating coil 184 to heat the compound if desired. The tank is open on top and may be slightly narrower from front to back than the belt 21 and be provided around its top edge with a sealing member 185 of rubber or the like to be pressed against the belt when the tank is at the upper limit of its travel.

A drip tank 186 independent of the impregnating tank 162 may be provided beyond the latter to the right if desired to catch excess liquid dripping from condensers after impregnation.

The gear wheels 80 and 180 are driven continuously and in synchronism to reciprocate the blocks 46 and 146 in a timed relationship as hereinafter described. The belt 21 is driven intermittently in timed relationship to the motion of the block 46 as hereinafter described. Mechanism to cause and control the synchronized motions of the belt 21 and the block 46 is not shown or disclosed as the nature and structure of such devices are well known and are not pertinent to the present invention, and a detailed showing and description thereof would be confusing and tend to befog the clarity of the explanation of the invention proper. For that matter, the belt 21 could be pulled along by hand.

The operation of the apparatus thus far disclosed is as follows:

Assembled electrical condensers which are to be baked and impregnated may be placed by hand upon the hooks 22 at the left of Fig. 1 near the pulley 23 by an attendant. The belt is then moved along, manually or automatically, while the blocks 46 and 146 are in their lowest positions until a series of untreated condensers equal in number to the number of bell jars 62 is positioned over the latter in 1-to-1 relation thereto.

In due course the pin 83 carries the slide 77 from left to right (Fig. 2) in the slot 79 turning the lever 53 counterclockwise and carrying the slide 76 to the left end of the slot 78 thus rotating the valve shaft 51 counterclockwise. This action opens the valves 54 and 58, closes the valves 55 and 57 and closes the electrical circuit through leads 73 and 74 thus supplying high frequency current to the coils 63. Compressed air is thus admitted to the passage 48 and the cylinder 42, and the riser 38 and telescopic connection 68 are evacuated. The piston 43 rises driving the block 46 up until the open mouths of the bell jars 62 are sealed by contact with the resilient belt backed by the block 25 and each of the condensers now in question stands in the magnetic field within one of the now energized coils 63. As the bell jars come into contact with the belt, the rod 26 opens the bore 65 by pushing down the valve piston 69, and the bell jars are evacuated by way of the connection 68 and the pipe 38. The effect of the intense and rapidly alternating magnetic fields is to generate electro-magnetic effects such as eddy currents or hysteresis losses within the metal parts of the condensers within the coils 63. These currents convert their energy into heat generated within the condensers, which rapidly and efficiently drives out any moisture occluded therein aided by the evacuation of the bell jars.

After an appropriately predetermined interval dependent on the rotational speed of the wheel 80, the pin 82 moves the lever arm 53 clockwise (Fig. 2) thus opening the circuit 73—74 at the terminal 75, opening the valves 55 and 57, and closing the valves 54 and 58. The result is that heating of the condensers stops as current is cut off from the coils 63, and the vacuum line is closed at 59; immediately after this compressed air enters the riser 38 from the valve 57 by way of pipe 61 and releases the suction of the bell jars on the belt. Immediately after this, the air pressure in the cylinder 42 is released through the exhaust valve 55 and the pipe 56, and the block 46 drops by gravity to its lowest position. The belt 24 then moves automatically or is pulled along to bring a fresh batch of condensers into position for baking and evacuation. Valves 58, 54, 55 and 57 are so constructed that the above described operations follow in the sequence stated.

In case it is desirable for any reason to bake the condensers in an inert gas or in a reducing atmosphere or the like, pipe 59 may be connected to a source of carbon dioxide, nitrogen, hydrogen, or the like appropriate gas under pressure instead of to an exhaust device. In this case valve 58 and valve 69 may be set to open a little before the bell jars reach their uppermost position.

When the belt 21 is stepped along to carry the batch of baked condensers away from the heating unit 40, it comes to rest with the condensers in position above the tank 162 and remains there while the wheel 180 makes one or more revolutions. At each revolution the wheel carries the tank up and immerses the hot condensers in the contents of the tank 162.

At the next progression of the belt, the dripping and cooling condensers stop over the drip tank 186.

If a cooling dip is found to be desirable, the apparatus of the impregnating unit 100 may be duplicated to the right thereof and this additional tank supplied with a bath of cooling oil, or a supply of cold compressed air.

Figure 5:
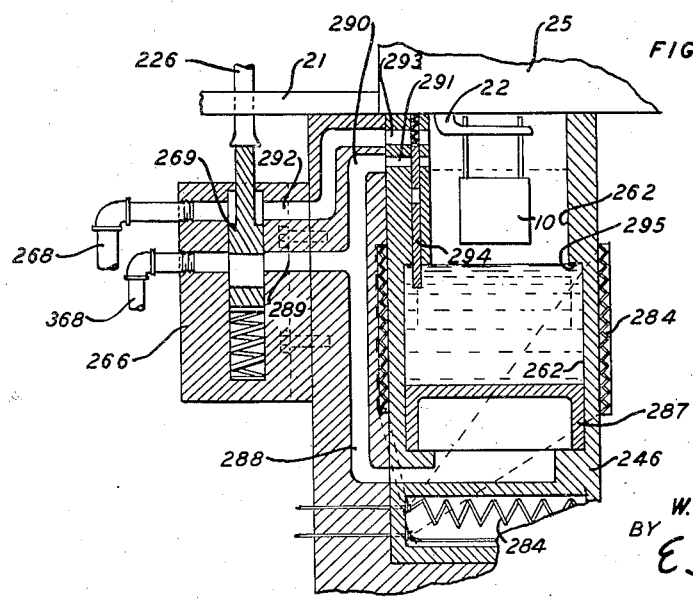
Fig. 5 is an enlarged broken view in central vertical longitudinal section of the upper left hand portion of Fig. 4.

If it be thought best to impregnate the baked and hot condensers in a vacuum or in a special atmosphere or under pressure, the apparatus disclosed in Figs. 4 and 5 may be substituted for the unit 100 of Fig. 1.

In this arrangement the base block 241 is like that of unit 40 in Fig. 1, with a compressed air cylinder 242, piston 243 and connecting rod 244 adapted to raise and lower a tank block 246 provided with a series of individual bath recesses 262 corresponding in number to the number of condensers to be simultaneously treated. Each recess has a vertically reciprocable piston 287 forming its floor. Each recess is further provided if desired with heating means 284.

A backing block 225 which may or may not be unitary with the block 25 holds the belt against the thrust of the block 246.

A passageway 288 leads from the bottom of the recess below the piston 287 to a bore 289 in a valve block 266 rigidly attached to the tank block, and another branch 290 of the same passage leads from the bore 289 to a bore 291 communicating with the interior of the recess 262 near its upper end. A second bore 292 in the valve block communicates with a bore 293 which also enters the recess 262 near its upper end.

A spring pressed slide valve 269 in the block 266 serves to open or close both bores 289 and 292, and is actuated by a rod 226 conveniently carried by the block 225. A second spring pressed slide valve 294 serves to open and close the bores 291 and 293 and is actuated by the piston 287.

A telescopic or flexible connection 268 leads from the bore 292 to a riser 238 which in turn is connected to a valve 258 coupled to a vacuum line. A similar connection 368 leads from the bore 289 to a riser 338 and a valve 254 coupled to a compressed air line. From the valve 254 a further passageway 248 leads to the cylinder 242. Also an exhaust or vent 256 is connected to the passageway 248 by way of a valve 255.

The three valves 254, 255 and 258 are mounted on and actuated by a common shaft 251 and operated by a mechanism like that in unit 40 of Fig. 1, including a gear wheel 280 with pins 282 and 283 to shift a lever arm 253. The wheel 280 may be driven through appropriate gears and shafts by the motor 81 or by an independent motor. In any case wheels 280 and 80 must be properly synchronized.

In operation, the belt 21 having come to rest with a batch of baked condensers in proper position above the block 246, the pin 283 throws the valve lever 253 over opening the compressed air supply valve 254 and the vacuum line valve 258, and closing the exhaust valve 255. At this time the valve 269 has closed both bores 289 and 292. Thus air is admitted under pressure below the piston 243 which rises carrying the block 264 up into contact with the belt 21 and positioning a condenser in the recess 262 but not yet immersed as the piston 287 is down. As the block 246 comes to a halt the rod 226 pushes the valve block 269 down opening the bores 289 and 292. The recess above the surface of the liquid therein is evacuated through the bores 293 and 292 and through the riser 268 and valve 258.

At the same time compressed air is admitted via the passage 288 under the piston 287 which rises until it is stopped by a stop shoulder 295 in the recess 262. During the latter part of this motion the piston 287 lifts the slide valve 294 closing the bore 293 and opening the bore 291, thus cutting off the vacuum line from the recess and admitting pressure air above the liquid.

In due course pin 282 rotates the lever arm 253 to close valves 258 and 254 and to open valve 255. The air in the cylinder 242 is then exhausted through the vent 256 and the piston 243 descends bringing with it the block 246. At the same time the air under the piston 287 exhausts through passage 288, bore 289, riser 368 and vent 256, the valve 269 having closed the bore 292 as the block 246 descended. The piston 287 descends swiftly owing to the initial pressure of air on the surface of the liquid and to its relatively small size, so that it has reached its lowest position within the block 246 before the valve 269 has closed the bore 289.

The belt 21 may then be stepped along to bring the freshly impregnated condensers over the drip tank 186 and a new batch of condensers over the block 246 for impregnation.

In some methods and apparatus heretofore in use, articles of the general character described, i. e. characterized by having metal interior parts have been dried or otherwise subjected to a baking process by being heated in an oven. In the case of one particular type of stack or pack condensers a treatment of upward of five or six hours at temperatures of the order of 250° F. was necessary to ensure driving the heat into the article enough to dry it completely throughout.

In the practise of the present invention it has been found that complete drying of the same type of condenser is effected by induction in the simple induction furnace described, in a period of time measured by seconds or at the most of the order of two or three minutes.

This shortening of the time required for the drying or baking enables the manufacture of such articles by at least partly automatic methods in continuous fashion since the articles may thus be treated in rapidly successive small batches on a conveyor instead of having to be accumulated in large numbers for economical simultaneous treatment in a large oven.

A characteristic feature of the invention which permits of this saving of time and consequently of the improved mode of manufacture is the production of heat within the article to dry it, or for any other purpose, by means of electro-magnetic effects such as eddy currents or hysteresis losses generated in metal parts within the article by induction in a varying magnetic field. The article is simply placed in the field, and no complications of connecting each article to and disconnecting it from a current source are necessary.

The embodiments of the invention in methods and in apparatus disclosed herein are merely illustrative and may be departed from and modified in many ways without departing from the scope and spirit of the invention as pointed out in and limited only by the appended claims.

What is claimed is:

1. A method of impregnating articles having internal metal parts surrounded by heat insulating material which comprises the steps of immersing such an article in a magnetic field of varying intensity to generate heat within the article from electro-magnetic effects induced within a metal part while simultaneously subjecting the article to a dry inert gas to drive moisture out of the article thereby, and treating the dried article with a liquid material to impregnate the same therewith.

2. In an apparatus for treating articles having internal metal parts, an open mouthed housing, means to close the housing, a conductive helix concentric with the housing, means to supply an alternating electric current to the helix, and means to create a vacuum within the housing, in combination with means to treat an article with liquid material.

3. In an apparatus for treating articles having internal metal parts, an open mouthed housing, means to close the housing, a conductive helix concentric with the housing, means to supply an alternating electric current to the helix, and means controlled by the first mentioned means to alter the atmospheric state within the housing.

4. In an apparatus for treating articles having internal metal parts, an open mouthed housing, means to close the housing, a conductive helix concentric with the housing, means to supply an alternating electric current to the helix, and means to create a vacuum within the housing.

5. An apparatus for impregnating articles having internal metal parts, which comprises a conveyor to carry articles, a first station and a second station associated therewith, drying means at the first station comprising a reciprocable support, an open mouthed housing thereon adapted to be closed by the conveyor in one position of the support, a conductive helix concentric with the housing, and means to supply alternating electric current to the helix, and impregnating means at the second station comprising a reciprocable support and a tank thereon for containing liquid material.

6. An apparatus for impregnating articles having internal metal parts, which comprises a conveyor to carry articles, a first station and a second station associated therewith, drying means at the first station comprising a reciprocable support, an open mouthed housing thereon adapted to be closed by the conveyor in one position of the support, a conductive helix concentric with the housing, means to supply alternating electric current to the helix, and means to draw gases and vapors from the housing, and impregnating means at the second station comprising a reciprocable support and a tank thereon for containing liquid material.

7. An apparatus for impregnating articles having internal metal parts, which comprises a conveyor to carry articles, a first station and a second station associated therewith, drying means at the first station comprising a reciprocable support, an open mouthed housing thereon adapted to be closed by the conveyor in one position of the support, a conductive helix concentric with the housing, means to supply alternating electric current to the helix, and means to draw gases and vapors from the housing and to supply other gases to the housing, and impregnating means at the second station comprising a reciprocable support and a tank thereon for containing liquid material.

WILLIAM B. BOHANNON.